United States Patent
Surratt

[19]

[11] Patent Number: 6,161,403
[45] Date of Patent: Dec. 19, 2000

[54] BICYCLE STEERING LOCK

[76] Inventor: James E. Surratt, 1120 Florida St., Pine Bluff, Ark. 71601

[21] Appl. No.: 09/435,419

[22] Filed: Nov. 8, 1999

Related U.S. Application Data

[60] Provisional application No. 60/140,828, Jun. 28, 1999.

[51] Int. Cl.[7] .................................................. E05B 71/00
[52] U.S. Cl. ................................. 70/34; 70/183; 70/233; 70/386
[58] Field of Search .......................... 70/14, 34, 54–56, 70/182–186, 233, 236, 386

[56] References Cited

U.S. PATENT DOCUMENTS

| | | | |
|---|---|---|---|
| 777,854 | 12/1904 | Hirschenfeld | 70/233 |
| 1,327,406 | 1/1920 | Racow | 70/185 |
| 1,408,652 | 3/1922 | Steinberg | 70/185 |
| 1,692,826 | 11/1928 | Ganz | 70/386 |
| 2,055,149 | 9/1936 | Hershbain | 70/236 |
| 2,143,502 | 1/1939 | Taman | 70/233 |
| 2,204,908 | 6/1940 | Olson | 70/233 |
| 2,231,546 | 2/1941 | Neiman | 70/233 |
| 2,303,241 | 11/1942 | Taman | 70/233 |
| 2,358,035 | 9/1944 | Schwinn | 280/279 |
| 2,544,590 | 3/1951 | Dyson et al. | 70/233 |
| 2,576,773 | 11/1951 | Buxton | 70/185 |
| 3,406,708 | 10/1968 | Maydock | 70/54 X |
| 3,863,472 | 2/1975 | Klingfus | 70/186 |
| 4,120,182 | 10/1978 | Michelman et al. | 70/34 X |
| 4,193,276 | 3/1980 | Lundberg | 70/34 |
| 4,232,537 | 11/1980 | Plaiss | 70/233 |
| 4,441,343 | 4/1984 | Nielsen, Jr. et al. | 70/386 X |
| 4,901,544 | 2/1990 | Jang | 70/386 X |
| 5,085,063 | 2/1992 | Van Dyke et al. | 70/218 |

FOREIGN PATENT DOCUMENTS

| | | | |
|---|---|---|---|
| 2603935 | 3/1988 | France | 70/34 |
| 379431 | 3/1940 | Italy | 70/185 |
| 449281 | 6/1949 | Italy | 70/34 |
| 474653 | 8/1969 | Switzerland | 70/34 |
| 256846 | 8/1926 | United Kingdom | 70/183 |
| 1526304 | 9/1978 | United Kingdom | 70/34 |
| WO92/10392 | 6/1992 | WIPO | 70/233 |

OTHER PUBLICATIONS

Online catalog, Carr Lane Manufacturing Co., St. Louis, MO Quick–Release Pins, pp. 6–7, Ball Lock Pins, pp. 8–9 Jul. 31, 00, www.carrlane.com.

*Primary Examiner*—Lloyd A. Gall
*Attorney, Agent, or Firm*—Ray F. Cox, Jr.

[57] ABSTRACT

A bicycle steering lock having a pin inserted into openings in the steering housing and the fork shaft to lock the steering of the bicycle. A lock guard is welded to the steering housing and a pin and ball receptacle is welded to the opposite side of the housing. A pin lock inserted through the lock guard, through the housing and the fork shaft into the pin and ball receptacle includes an outer pin containing a pair of ball bearings disposed within openings in the end of the outer pin. When inserted the pair of ball bearings are disposed adjacent to depressions in the inside surface of the pin and ball receptacle. A cylinder key lock is attached at the end opposite the key to a rotator which engages an inner pin. The inner pin has a large diameter section and a reduced diameter section at its end. When the large diameter section is in contact with the ball bearings, the ball bearings protrude through the outer pin and engage the depressions in the pin and ball receptacle to lock the outer pin to the pin and ball receptacle. When the inner pin is withdrawn so that the ball bearings are in contact with the reduced diameter section, the ball bearings can fall away from the depressions and the pin lock can be withdrawn from the bicycle.

7 Claims, 4 Drawing Sheets

BICYCLE STEERING LOCK

This application claims the benefit of U.S. Provisional Application No. 60/140,828, filed Jun. 28, 1999.

BACKGROUND OF THE INVENTION

The present invention relates to bicycle steering lock, and in particular, to a key locking mechanism which pins the steering shaft so that the bicycle cannot be steered while the pin is in position.

Various locking mechanisms are known which employ a pin through the steering shaft to lock the steering shaft so that the bicycle cannot be steered, thus discouraging theft or tampering.

For example, U.S. Pat. No. 3,863,472 to Klingfus discloses a bicycle locking device which may be manufactured as part of the original equipment of the bicycle or may be added on at a later date. The device is mounted to the tubular head portion of the bicycle with a circular mounting ring. The circular mounting ring has a rear facing body portion with a key operated locking mechanism. There is an opening through which a spring operated plunger is released or withdrawn by the key mechanism. The plunger passes through the opening in the tubular head and engages one of a number of apertures in the steering wheel post. The Klingfus device does not operate with an inner and an outer plunger and does not employ ball bearings received in a receptacle to lock the plunger into place. Furthermore, the Klingfus device does not employ a retractable plunger and lock mechanism which may be removed from the bicycle entirely.

U.S. Pat. No. 777,854 to Hirschenfeld discloses a combination type of bicycle steering lock which uses a pin which passes through the steering fork shaft so that the steering wheel cannot be turned. The lock mechanism is a combination lock with a series of rotating rings which have slots in the inner sides. The pin has a series of projections which are able to pass through the slots when the rotating rings are in the proper positions, but which prevent the pin from being withdrawn when the rings are rotated out of the proper positions. Hirschenfeld does not disclose an inner and outer pin arrangement, nor the use of a ball and pin receptacle to lock the pin in place. Hirschenfeld has an integral key and pin mechanism.

U.S. Pat. No. 4,232,537 to Plaiss discloses a bicycle lock which uses a standard cylinder type lock mechanism. In the Plaiss device the cylinder lock mechanism operates a crank type linkage with an attached pin which may be inserted into or withdrawn from an opening in the steering wheel fork. In addition to the pin the lock mechanism also operates a bar which locks over rings attached to a rope for anchoring the bicycle to a metal post or rack. Plaiss does not employ an inner and outer pin arrangement or ball bearings to lock the pin in position.

The limitations of the prior art are overcome by the present invention as described below.

SUMMARY OF THE INVENTION

The present invention is a bicycle steering lock to discourage theft or tampering. A typical arrangement of a bicycle handle bar has the handle bar attached to a fork shaft to the front wheel. The fork shaft is journaled through a tubular housing. The steering lock of the present invention is a key operated mechanism which includes a pin inserted into openings in the housing and through the fork shaft to lock the steering of the bicycle into a fixed position.

The steering lock comprises a lock guard welded to the steering housing and a pin and ball receptacle welded to the opposite side of the housing. A pin lock is inserted through the lock guard, through the housing and the fork shaft into the pin and ball receptacle, which prevents turning the fork shaft while the pin lock is in position.

The pin lock includes an outer pin containing a pair of ball bearings disposed within openings in the end of the outer pin. When inserted in the pin and ball receptacle the pair of ball bearings are disposed adjacent to depressions in the inside surface of the pin and ball receptacle.

A cylinder type key lock mechanism is attached at the end opposite the key to an inner pin rotator which engages an inner pin. The inner pin is provided with inclined wedges which interact with complementary inclined wedges so that as the key is turned, the inner pin moves axially as well as rotating.

The inner pin has a large diameter section and a reduced diameter section at its end. When the large diameter section is in contact with the ball bearings, the ball bearings protrude through the outer pin and engage the depressions in the pin and ball receptacle thereby locking the outer pin to the pin and ball receptacle. When the inner pin is withdrawn by rotating the key to the extent that the ball bearings are in contact with the reduced diameter section, the ball bearings can fall away from the depressions and the pin lock withdrawn from the bicycle.

An alternative embodiment of the inner pin and rotator employs a threaded rotator thus allowing a threaded inner pin to move axially without rotating.

It is therefore an object of the present invention to provide for a bicycle lock which prevents unauthorized tampering or theft by locking the steering of the bicycle into a fixed position thus preventing the bicycle from being steered while the lock mechanism is in position.

It is a further object of the present invention to provide for such a bicycle lock which requires minimal alteration to the structure of the bicycle.

It is also an object of the present invention to provide for a bicycle lock which is durable and resistant to tampering.

It is an additional object of the present invention to provide for a bicycle lock which may be substantially removed from the bicycle when not required.

These and other objects and advantages of the present invention will be apparent from a consideration of the following detailed description of the preferred embodiments in conjunction with the appended drawings as described following.

DETAILED DESCRIPTION OF THE PREFERRED EMBODIMENTS

The present invention is a bicycle steering lock. With reference to FIGS. 1–6, the preferred embodiment of the present invention may be described.

Figure 1:
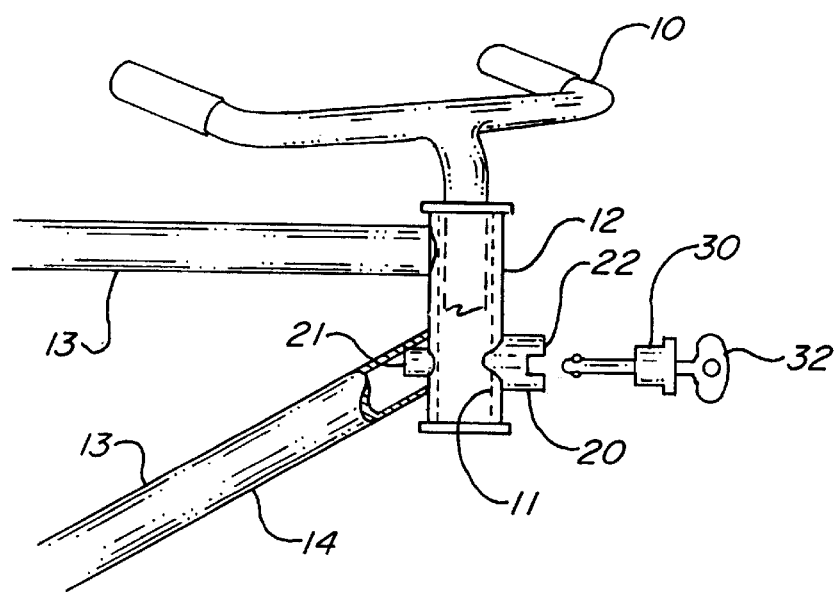
FIG. 1 is a partial elevational view of a bicycle frame and the pin lock of the present invention in an exploded orientation.
Figure 1A:
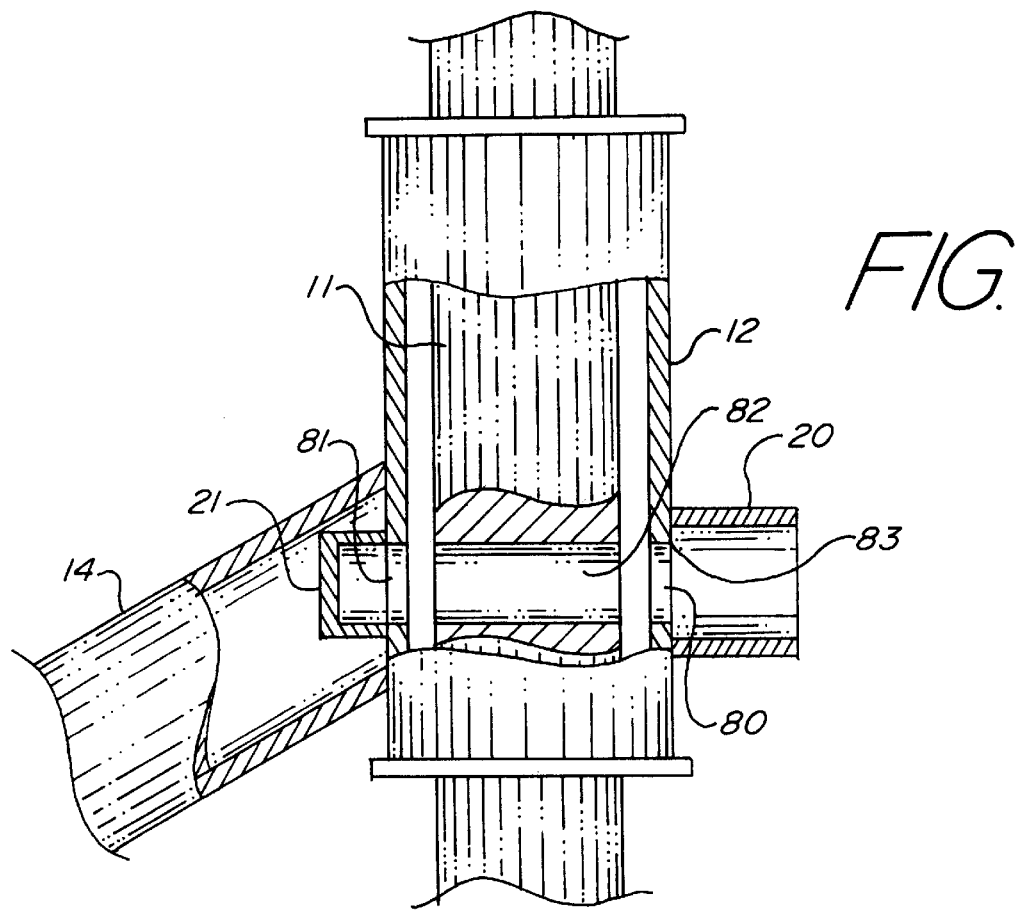
FIG. 1A is a sectioned detail of the housing of FIG. 1.

With reference to FIGS. 1 and 1A, a typical arrangement of a bicycle handle bar is shown. The handle bar 10 is attached to a fork shaft 11 which passes through a housing 12. The housing 12 is attached to the frame 13.

The steering lock includes a lock guard 20 affixed (e.g., by welding) to the steering housing 12. A perforation 80 is drilled through a front portion of the housing 12 and an aligned perforation 81 is drilled through a rear portion of the housing 12. A perforation 82 alignable with the perforation 80 and aligned perforation 81 is drilled through the fork shaft 11. A pin and ball receptacle 21 having an interior cavity is affixed (e.g., by welding) to the rear portion of the housing 12 in alignment with the aligned perforation 81. As shown on FIGS. 1 and 1A, in the preferred embodiment the pin and ball receptacle 21 is actually inside the tubular hollow frame member 14, which protects it from tampering.

The pin lock 30 in inserted through the lock guard 20, through the housing 12 and the fork shaft 11 into the pin and ball receptacle 21. The fork shaft 11 is therefore prevented from turning while the pin lock 30 is in position. When fully inserted, the pin lock 30 engages slots 22 in the lock guard 20 with lugs 31. This prevents the pin lock 30 from rotating in the lock guard 20 when the key 32 is being operated. The key lock mechanism 40 is any of a number of such "off the shelf" locking mechanisms, preferably a key-operated cylinder type. The key lock mechanism 40 is housed in a barrel 41 which is integrally attached to an outer pin 42. The diameter of the outer pin 42 is smaller than the diameter of the barrel 41 and thus forms a shoulder 43 which rests against a complementary shoulder 83 in the lock guard 20 when the pin lock 30 is inserted into the lock guard 20. The complementary shoulder 83 in the lock guard 20 is formed by the steering housing 12 since the inner diameter of the bore of the lock guard 20 is greater than the diameter of the perforation 80 in the housing 12. The end of the outer pin 42 is thus positioned with respect to the pin and ball receptacle 21 so that a pair of ball bearings 50 are adjacent to the depressions 51 in the interior cavity of the pin and ball receptacle 21. The ball bearings 50 are housed within openings in the wall of the outer pin 42 which allow the ball bearings 50 to protrude through the wall of the outer pin 42 but prevents the ball bearings 50 from passing through completely.

Figure 3:
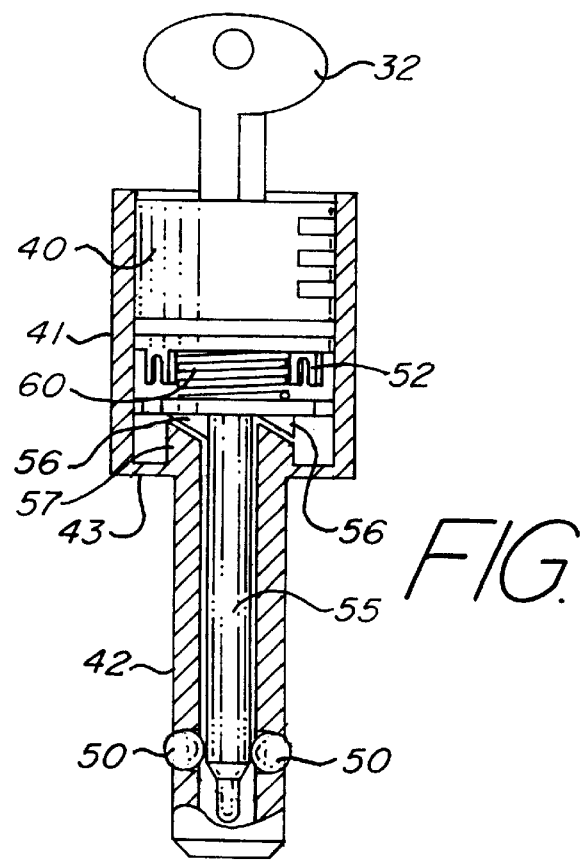
FIG. 3 is a sectional view of the pin lock.
Figure 5:
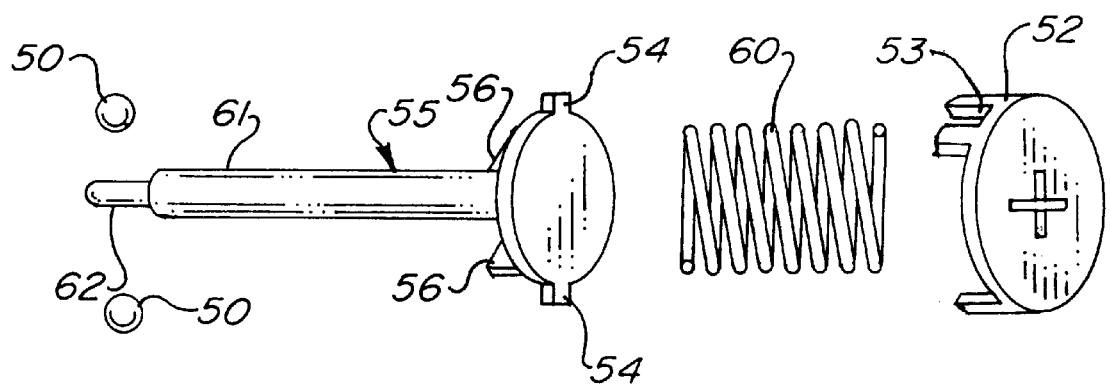
FIG. 5 is an exploded isometric view of another embodiment of the inner pin and pin rotator wherein the pin rotator receives the inner pin in slots and the inner pin is moved axially by inclined wedges.

The outer pin 42 has an interior bore in which an inner pin 55 is received. The key lock inner cylinder 40 is rotatable within the barrel 41. The key lock inner cylinder 40 is attached at the end opposite the key 32 to the inner pin rotator 52. As shown in FIGS. 3 and 5, the inner pin rotator 52 has a pair of slots 53 which engage projections 54 on the inner pin 55. Turning the key 32 therefore turns the inner pin rotator 52 which in turn rotates the inner pin 55. The slots 53 allow the inner pin 55 to move axially as well. For clarity, FIG. 3 illustrates the slotted rotator 52 with the slots 53 disengaged from the projections 54 on the inner pin 55, although in practice the slots 53 will always be engaged with the projections 54.

The inner pin 55 is provided with inclined wedges 56 which interact with complementary inclined wedges 57 in the barrel 41 so that as the key 32 is turned, the inner pin 55 moves axially as well as rotating. A spring 60 between the inner pin rotator 52 and the inner pin 55 maintains the inner pin 55 in firm contact with the complementary inclined wedges 57.

The inner pin 55 has a larger diameter section 61 except at its tip where a reduced diameter section 62 occurs. When the large diameter section 61 is in contact with the ball bearings 50, the ball bearings 50 are forced to protrude to the maximum extent through the wall of the outer pin 42 and engage the depressions 51 in the pin and ball receptacle 21 thereby locking the outer pin 42 to the pin and ball receptacle 21. When the inner pin 55 is withdrawn to the extent that the ball bearings 50 are in contact with the reduced diameter section 62, the ball bearings 50 can fall away from the depressions 51 and the pin lock 30 may be withdrawn from the lock guard 20.

Figure 6:
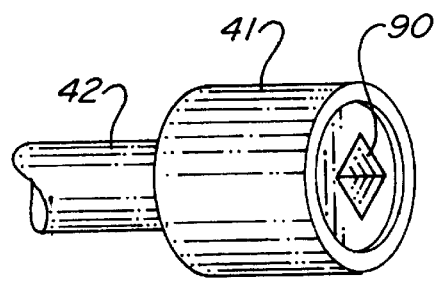
FIG. 6 is a sectioned isometric view of the square opening in the barrel as employed in cooperation with the alternative embodiment on the inner pin of FIG. 4.
Figure 2:
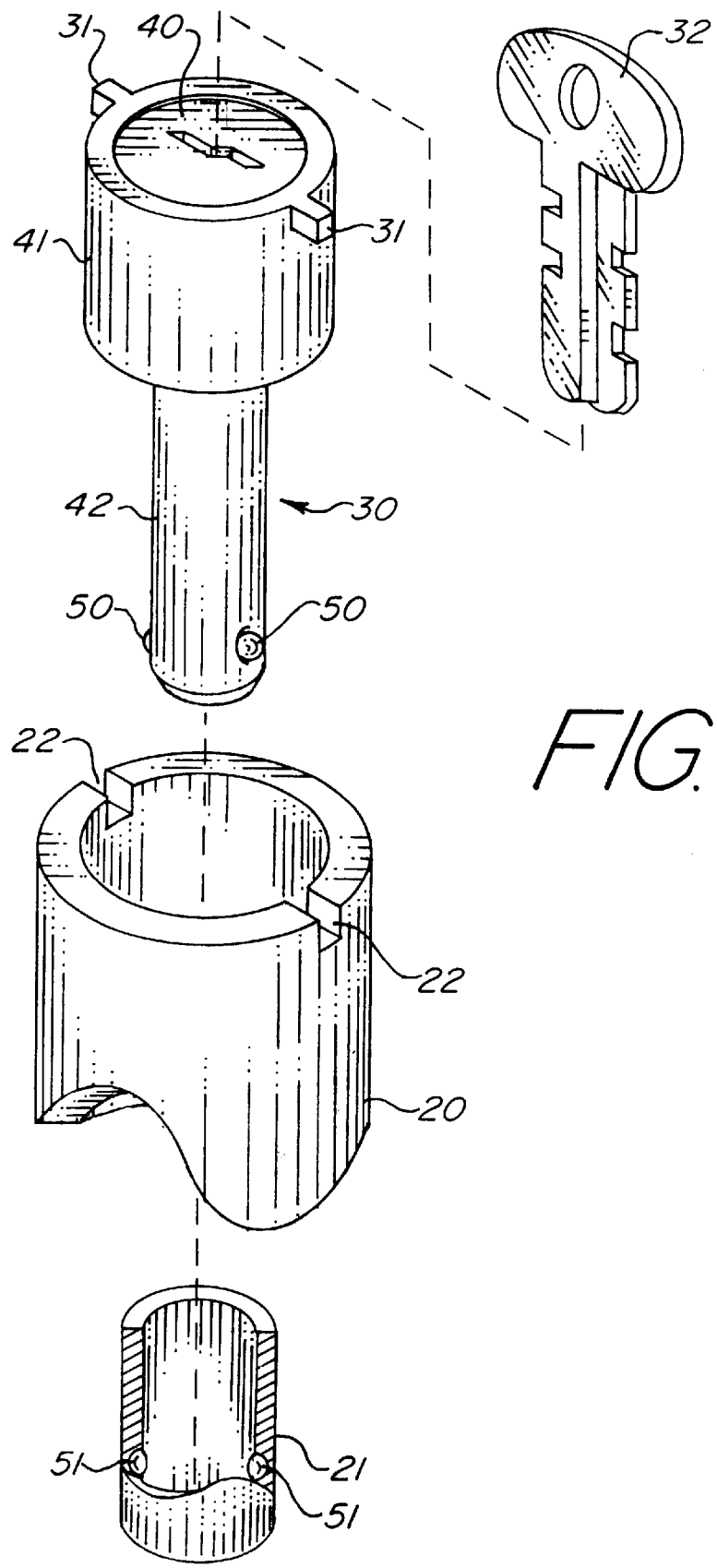
FIG. 2 is an exploded isometric view of the lock guard, pin and ball receptacle and pin lock of the present invention where the pin and ball receptacle is partially sectioned.
Figure 4:
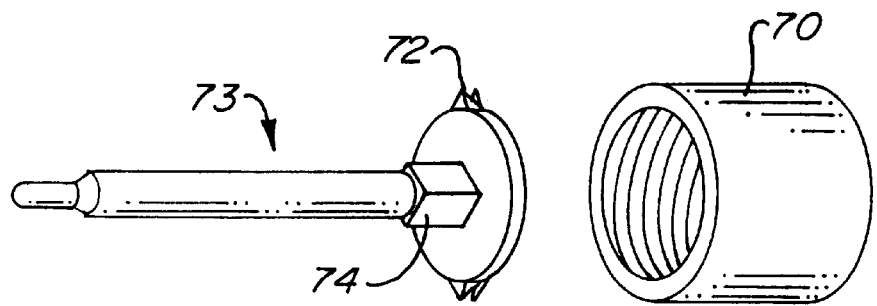
FIG. 4 is an exploded isometric view of one embodiment of the inner pin and pin rotator wherein an inner threaded rotator receives the threads of the inner pin.

As described with reference to FIG. 4, an alternative embodiment of the inner pin and rotator employs a threaded rotator 70 in place of the slotted inner pin rotator 52. The threaded rotator 70 is internally threaded and engages external threads 72 on the threaded inner pin 73. In order to prevent the threaded inner pin 73 from rotating, the threaded inner pin 73 is provide with a square section 74 which would be received into a square opening 90 in the barrel 41 as shown in FIG. 6, thus allowing the threaded inner pin 73 to move axially without rotating. Otherwise, the threaded inner pin 73 has the same constituents elements and the same function as the inner pin 55.

The present invention has been described with reference to certain preferred and alternative embodiments that are intended to be exemplary only and not limiting to the full scope of the present invention as set forth in the appended claims.

What is claimed is:

1. In combination, a bicycle and bicycle steering lock locking the steering wheel of a bicycle against steering movement, the bicycle having a hollow tubular steering housing in which is journaled a fork shaft, a perforation through a front portion of the steering housing, an aligned perforation through a rear portion of the steering housing, and a perforation through the fork shaft alignable with the perforations of the steering housing, the steering lock comprising:

a key operated cylinder lock having a barrel and an inner cylinder rotatable within said barrel by turning a key;

a lock guard affixed to the front portion of the steering housing and having a bore therein aligned with the perforation of the front portion of the steering housing, said lock guard further having a shoulder for removably receiving said cylinder lock and means for preventing rotation of said barrel of said cylinder lock while said cylinder is rotated by the key;

an outer pin affixed to said barrel and having an interior bore;

an inner pin rotator affixed to an end of said cylinder for rotation within said interior bore by turning said key;

an inner pin within said bore of said outer pin and axially movable within said bore, means for axial movement of said inner pin by rotation of said cylinder;

said inner pin having a large diameter section and a reduced diameter section;

at least one ball bearing disposed between said inner pin and said outer pin;

said outer pin having a wall and at least one opening through said wall, wherein said opening is sized to force said ball bearing to protrude beyond said wall but not pass through said wall when said ball bearing is disposed between said wall of said outer pin and said large diameter section of said inner pin and further wherein said ball bearing is not forced to protrude beyond said wall when said ball bearing is disposed between said outer pin and said reduced diameter section of said inner pin; and a pin and ball receptacle affixed to the rear portion of the steering housing, said pin and ball receptacle having a side wall and a closed end defining a cavity therein, said cavity being aligned with the aligned perforation in the rear portion of the steering housing;

said pin and ball receptacle having at least one depression in an inner surface of said side wall, said depression being disposed so that when said barrel is seated against said shoulder of said lock guard, said opening in said wall of said outer pin is disposed adjacent to said depression whereby protrusion of said ball bearing through said opening engages said ball bearing with said depression.

2. The combination of claim 1 wherein said means for axial movement of said inner pin by rotation of said cylinder comprises one or more axial slots in said inner pin rotator and one or more projections on said inner pin engaging said slots for axial movement without relative rotation, one or more inclined wedges on said inner pin, one or more complementary inclined wedges on said barrel engaging said inclined wedges on said inner pin whereby rotation of said inner pin rotator causes said wedges and said complementary wedges to interact so as to move said inner pin axially, and a spring biasing said wedges and said complementary wedges into contact.

3. The combination of claim 1 wherein said means for axial movement of said inner pin by rotation of said cylinder comprises external threads on said inner pin and internal threads on said inner pin rotator engaging said external threads of said inner pin, said barrel having a square opening and said inner pin having a square section received in said square opening for axial motion of said inner pin without rotation.

4. The combination of claim 2 wherein said means for preventing rotation of said barrel of said cylinder lock comprises at least one lug on said barrel and at least one slot in said lock guard for engaging said lug.

5. The combination of claim 4 wherein the bicycle has a tubular frame member affixed to said steering housing and said pin and ball receptacle is disposed within said tubular frame member.

6. The combination of claim 3 wherein said means for preventing rotation of said barrel of said cylinder lock comprises at least one lug on said barrel and at least one slot in said lock guard for engaging said lug.

7. The combination of claim 6 wherein the bicycle has a tubular frame member affixed to said steering housing and said pin and ball receptacle is disposed within said tubular frame member.

* * * * *